Figure 1:
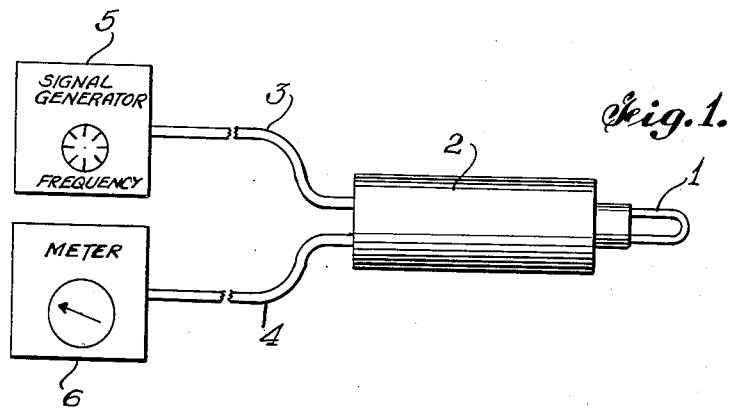

March 5, 1957  S. J. MEHLMAN  2,784,375
CIRCUIT RESONANCE INDICATOR
Filed Dec. 17, 1953

INVENTOR.
SAMUEL J. MEHLMAN
BY Samuel J. Stree
ATTORNEY

United States Patent Office 2,784,375
Patented Mar. 5, 1957

2,784,375

CIRCUIT RESONANCE INDICATOR

Samuel J. Mehlman, Jamaica, N. Y., assignor to Dynamic Electronics-New York, Inc., Glendale, N. Y.

Application December 17, 1953, Serial No. 398,771

8 Claims. (Cl. 324—57)

This invention relates to the art of electrical measuring instruments and particularly concerns an indicator for detecting and measuring circuit resonances, for use as a wavemeter, and the like.

It is an object of the invention to provide a simple, relatively inexpensive, versatile instrument for measuring the natural resonant frequencies of resonant circuits.

It is a further object to provide a device for measuring the natural resonant frequencies of passive networks without the necessity of applying power to activate the networks during measurement.

It is a further object to provide a circuit resonance indicator which has a greater frequency measuring range than conventional instruments.

It is a further object to provide an instrument capable of measuring the self resonant frequencies of de-energized radio frequency coils, transformers, circuits and the like.

It is a further object to provide a circuit resonance indicator which is smaller and more easily and accurately used than conventional instruments.

It is a further object to provide a novel wavemeter for measuring the resonant frequencies of oscillators, oscillating circuits, and the like.

Figure 2:
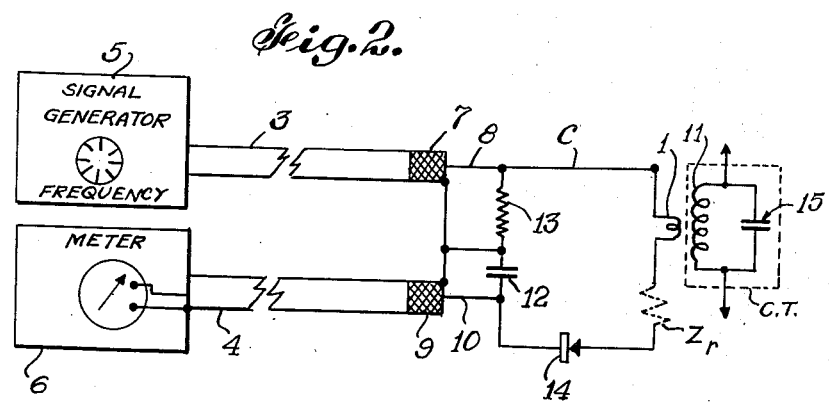
Figure 3:
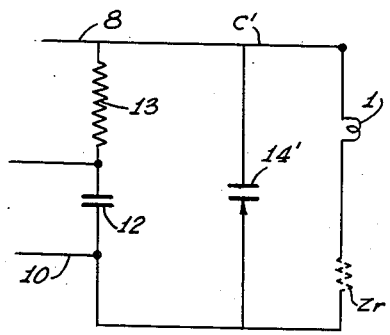

Other and further objects of the invention will become readily apparent from the following description taken together with the drawing wherein:

Fig. 1 is a representation partly diagrammatic of a basic arrangement comprising the invention, and Fig. 2 is a schematic representation of the invention and illustrating the method of its use. Fig. 3 shows an alternative circuit arrangement.

In measuring the inherent resonant frequencies of high frequency resonant circuits it is conventional to use circuit resonance indicators of the grid-dip type. The usual grid-dip instrument includes an integral meter and a calibrated capacitatively tuned oscillator which in use is coupled inductively or capacitively to a circuit under test. This coupling between the oscillator of the indicator and the circuit under test changes the frequency calibration of the indicator so that accurate measurements cannot be made. When the frequency measurements are to be made at frequencies exceeding 400 megacycles per second and approaching or even exceeding 1000 megacycles per second the coupling inductance required in the probe external of the indicator becomes so small both electrically and physically that adequate coupling of the indicator to a circuit under test required to render accurate measurements becomes impossible.

Grid-dip meter oscillators are invariably encased in a small, portable, shield can. For this as well as for economic reasons, the oscillators are often lacking in stability, they overheat, are fragile and are subjected to more than ordinary rough handling. As a consequence, the accuracy and life of such an instrument is not too good. The instrument usually includes a built-in meter in the assembly which adds to the cost of and complicates its manufacture. The conventional grid-dip meter is capable of measuring only the limited range of frequencies to which the oscillator is tunable. The tunable circuit includes and requires a coupling probe of critical size for each limited range of frequencies. In many cases the probe is so large that accurate measurements cannot be made in complex equipment where there are many closely spaced resonant circuits to be tested.

It is proposed in the present invention to provide a circuit resonance indicator which avoids all of the above mentioned disadvantages. The circuit resonance indicator of the present invention is considerably simpler than has heretofore been known. The indicator contains no vacuum tubes, nor built-in meter, nor other parts that require frequent replacement. The indicator covers a wider frequency range and with greater accuracy than is possible with conventional grid-dip type meters. The indicator is readily usable in the range of less than 10 to more than 1000 megacycles with an accuracy within plus or minus one-half percent. The instrument has a wide range of applications. It is very useful, for example, to measure the self-resonance of radio frequency coils or to pre-tune radio frequency and intermediate frequency circuits to resonance without applying power to the system containing the circuits. The basic instrument can be manufactured at low cost because it contains only few, stable, passive elements. The basic body of the instrument is of small dimensions and includes a very small untuned probe loop which provides accessibility to circuit elements in close place where conventional instruments cannot be used. This small probe may be placed so closely adjacent a circuit under test that nearby situated circuits will not interfere with the accuracy of measurements.

The invention will be best understood with reference to the drawing. In Fig. 1, the probe 1 is a small inductive coupling loop connected to the body 2 of the indicator. The body of the indicator is of the order of two inches in length and about a square inch in cross-section. The external dimensions of the coupling loop are of course much smaller. The body of the indicator is connected by shielded and preferably coaxial conductors 3 and 4 to a signal generator 5 and meter 6 respectively. The signal generator is an essential component of the test set-up. It should have a variable frequency output exceeding 10,000 microvolts in amplitude, the frequency range should be adjustable over the range corresponding to that in which the indicator is to be used. It is important that frequency indicator of the signal generator be accurately calibrated, within one percent or even 0.1 of one percent if possible, since the accuracy of the circuit resonance indicator will depend on the accuracy of frequency calibration of the signal generator. The meter 6 should be a sensitive D.-C. ammeter having a scale range of the order of 0 to 100 microamperes. An A.-C. voltmeter should be used if the radio frequency output of the signal generator is audio modulated. A meter having a full scale range of 0.01 volt will suffice for the present arrangement. If desired a vacuum tube voltmeter can be used. The body 2 of the instrument includes the circuit C shown in Fig. 2. This circuit consists of a series arrangement of a loading resister 13, by-pass capacitor 12, and crystal rectifier 14 in addition to the coupling loop 1. The circuit C. T. represents a circuit under test, for example a non-energized passive network whose parallel resonant frequency is to be determined, and may be represented in terms of an equivalent capacitance 15 and an equivalent inductance 11. The coupling loop 1 in the instrument body 2 is connected to the center conductor 8 of the shielded conductor 3. The shield 7 of conductor 3 is connected between resistor 13 and capacitor 12 so that a constant voltage is applied to the circuit C. The meter 6 is connected to the circuit C via the shielded conductor 4. The center conductor 10 is connected between the loop 1 and the crystal rectifier 14, while the shield 9 is connected in common with the shield 7 of conductor 3.

As recommended values for the various components of the resonance indicator, resistor 13 may be 50 ohms if conductor 3 is a 50 ohm line. Since resistor 13 is a terminating resistor for the line it should of course match the impedance of the line. Capacitor 12 may be of the order of 1000 mmf. and should have a suitable low impedance to act as an effective by-pass path for high frequency currents. The crystal rectifier 14 may be a germanium crystal of a type well known in the art and proven effective for rectifying high frequency currents. Loop 1 is a single small loop of very few turns to minimize its inductive reactance at high frequencies. It may be even a half turn and should project from body 2 only sufficient to couple radiated power between the circuit under test and the resonance indicator. It is important to note that the length of loop 1 is not critical. The loop is not intended to be part of a capacitively tuned resonant circuit as is the loop or probe in a conventional grid-dip meter. Loop 1 is employed only as an untuned coupling means so that it can be used for the entire range of frequencies which the resonance indicator is capable of handling. In conventional grid-dip meters, the length of the coupling lop is critical because its is part of the circuit which tunes the oscillator of the instrument. The present invention employs no integral tunable oscillator. The generator 5 is an independent source of high frequency power and is loaded so that variations in energy picked up by the loop 1 do not change the basic calibrated frequency of the signal generator. This is an important advantage of the invention because the generator used can be a carefully built, accurately calibrated, fully stable shielded source of high frequency power, of a type usually found in laboratories, factories and wherever frequency measurements of the type described herein are to be made. By contrast the oscillators used in conventional grid-dip meters are necessarily small and are less accurate than the type of signal generator contemplated for use in the present invention. As an example of the conventional grid-dip meter above referred to, from which the present invention as described herein is a radical departure, may be cited that described in the April 1953 issue of "Electronics," pages 175-177, published by McGraw-Hill Publications, New York, New York.

In operation the output of the signal generator 5 or the range switch on the meter 6 if one is provided thereon is adjusted until the meter indicates approximately half-scale. The loop 1 is placed in the vicinity of the circuit under test and the frequency of the signal generator is tuned until a sharp dip in the meter indication is observed. This indicates the circuit under test is at the same frequency as the signal generator because the meter dip is caused by absorption of power from the signal generator by the resonating circuit under test. The resonant frequency of the circuit under test is then that of the signal generator output frequency as indicated by its calibrated reading. If the signal generator has an output rich in harmonics there is a possibility that the true resonant frequency of the circuit under test is a multiple of the indicated signal generator frequency. The test should then be repeated at multiples of the signal generator frequency dial indication to determine the true resonant frequency of the circuit under test.

In the circuit C of Fig. 2, the current through crystal 14 is, for a constant applied input voltage, a function of the impedance of the coupling loop 1, and the reflected impedance from the circuit under test, which may be represented as $Z_r$. When the circuit under test C. T. is not in resonance at the frequency of the current in circuit C supplied by the signal generator, $Z_s$, the equivalent series impedance of circuit C. T., is quite high and $Z_r$ is relatively small. When the circuit under test C. T. is in resonance at the frequency of the current in circuit C, $Z_s$ becomes small and $Z_r$ becomes large causing a drop in the current through crystal 14 as measured by meter 6. This drop or dip in meter indication is then a direct showing that the frequency of the signal generator output is the same as the resonant frequency of the circuit under test.

It may be found desirable for operating at some frequencies to have the crystal in shunt with the coupling loop 1 rather than in series with it. This shunt arrangement is shown in Fig. 3. Here the crystal 14' acts in circuit C' as a current divider with the loop 1. In this case the meter dip may be found to be better than with the series arranged crystal.

It will be noted that in the present invention the current indication of meter 6 comes from a constant voltage source which is virtually unaffected by changes in loading. This contrasts with the operation of conventional grid-dip meters in which the current indication is actually a measure of the grid current of an integral oscillator so that the dip in meter reading indicates a change in the operation of the oscillator rather than a change in current in a circuit under test. A particular advantage of the present invention is that the instrument employs an external stable source of radio frequency power which is generally available and will be found to provide a more accurate (frequency-wise) indication of frequency than is likely to be found in conventional grid-dip meters.

Another use for the present invention which will be found very useful is as an indicator of the Q of a circuit under test, where:

$$Q = \frac{\Delta f}{f_o}$$

and where $f_o$ is the equivalent series resonant frequency of the circuit under test, while $\Delta f$ is the frequency bandwidth including $f_o$ at half-power, i. e. where the voltage amplitude is at least 0.707 of the maximum amplitude as indicated by a voltmeter employed as meter 6.

A further important use of the present invention is as a wavemeter to measure the resonant frequency of an oscillator or resonating tuned circuit. In this application the probe 1 would be disposed in the near vicinity of an oscillating tuned circuit such as C. T. in Fig. 2 to pick up a radiated signal therefrom. The meter 6 in this application of the instrument could be either a D.-C. microammeter or a sensitive A.-C. voltmeter, while the frequency output of the signal generator 5 could be unmodulated. Signal generator 5 would then be adjusted to produce about one-half scale deflection of meter 6. The frequency control of the signal generator would then be varied until the meter needle dipped sharply when the two signals cancelled each other in the crystal mixer circuit C. At this frequency setting, the frequency of the signal generator would be equal to that of the oscillator under test. The frequency of the oscillator would thus be determined to a high degree of accuracy. This additional application of the present invention as a wavemeter would further insure the user of the instrument that the instrument is capable of making every measurement and determination possible with any conventional grid-dip meter, but with more accuracy, economy, and efficiency.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. An electrical resonance frequency indicator, comprising a coupling loop and a loading resistor connected in series circuit, a rectifier in circuit with the loop, an independent source of high frequency current variable through said resonance frequency connected across said resistor, and an external indicator electrically connected to said series circuit to indicate a change of current flow therein.

2. An electrical circuit resonance frequency indicator comprising a series circuit including an untuned coupling loop, a loading resistor and a by-pass capacitor, a rectifier connected in series with the loop, an independent source of high frequency current variable through said resonance frequency connected across said resistor, and an external indicator electrically connected to said series circuit to indicate a change in current flow therein.

3. An electrical circuit resonance frequency indicator comprising a series circuit including an untuned coupling and a loading resistor, a rectifier in shunt circuit with the loop, and independent source of high frequency current variable through said resonance frequency connected across said resistor, and an external indicator electrically connected to said series circuit to indicate a change of current flow therein.

4. An electrical circuit resonance frequency indicator including a small untuned coupling loop, a loading resistor, and by pass capacitor connected in series circuit, a crystal rectifier in circuit with the loop, an independent variable high frequency signal generator having a calibrated frequency the same as said resonance frequency plus or minus one-half percent connected across said resistor, and a sensitive electrical meter for indicating a change in current flow in said series circuit connected across said capacitor.

5. An indicator for measuring the equivalent series resonant frequency of a deenergized passive network, comprising in series circuit a small coupling loop and a loading resistor, a crystal rectifier in circuit with the loop, a signal generator variable in frequency through said resonant frequency connected across said resistor, and an electrical meter connected to said generator and circuit, said series circuit and crystal being enclosed in a miniature cylindrical body.

6. An electrical circuit resonance indicator in accordance with claim 4 wherein the meter is a direct current microammeter.

7. An electrical circuit resonance indicator in accordance with claim 4 wherein the generator has an audio modulated radio frequency output and the meter is a sensitive A. C. voltmeter.

8. An electrical circuit resonance indicator in accordance with claim 5 wherein the body is of the order of two inches in length and one square inch in cross section.

References Cited in the file of this patent

UNITED STATES PATENTS

| | | |
|---|---|---|
| 1,445,636 | Meissner | Feb. 20, 1923 |
| 1,695,047 | Horton | Dec. 11, 1928 |

OTHER REFERENCES

Fitzmorris: Abstract 580, 216, filed Feb. 28, 1945. Published May 9, 1950.